United States Patent [19]

Bradley

[11] Patent Number: 4,891,774
[45] Date of Patent: Jan. 2, 1990

[54] DUAL MODULUS FRACTIONAL DIVIDER

[75] Inventor: Donald A. Bradley, Morgan Hill, Calif.

[73] Assignee: Wiltron Company, Morgan Hill, Calif.

[21] Appl. No.: 175,759

[22] Filed: Mar. 31, 1988

[51] Int. Cl.$^4$ .............................................. G06F 7/68
[52] U.S. Cl. ...................................................... 364/703
[58] Field of Search ......................................... 364/703

[56] References Cited

U.S. PATENT DOCUMENTS 4,241,408  12/1980  Gross .................................. 364/703

OTHER PUBLICATIONS

P. Higgins et al., "Developing a Slow Clock Rate from a Master Clock which is not an Integral Multiple of the Slow Clock", IBM Technical Disclosure Bulletin, vol. 24, No. 7A, Dec. 1981, pp. 3117–3118.
A. Wallner, "Binary Rate Multiplier Controls AC Power", Contron Engineers, Jan. 1972, pp. 50–51.

Primary Examiner—David L. Clark
Assistant Examiner—Long T. Nguyen
Attorney, Agent, or Firm—Fliesler, Dubb, Meyer & Lovejoy

[57] ABSTRACT

A dual modulus fractional divider having a dual modulus prescaler coupled to a programmable divider. Latches and a full adder are provided for programming the programming divider with a modulus A, a modulus B, a modulus (A−1) and a modulus (B+1). A rate multiplier controls the adder to provide the desired resolution of the divider.

6 Claims, 3 Drawing Sheets

DUAL MODULUS FRACTIONAL DIVIDER

BACKGROUND OF THE INVENTION

1. Cross-Reference to Related Application

U.S. patent application entitled "Microwave Measurement System And Associated Method", invented by Martin I. Grace et al, filed on the same date as the present application, and owned currently and at the time of invention by a common assignee, is incorporated by reference.

2. Field of the Invention

The present invention relates to dividers in general and in particular to a dual modulus fractional divider for use in phase-locked loops which have an output frequency above 80 mHz, a resolution of 100 kHz or better and a loop band width of at least 100 kHz.

3. Description of the Prior Art

A typical phase-locked loop comprises a voltage controlled oscillator (VCO), a divider for dividing the output of the VCO, a phase detector, a reference oscillator having a fixed output frequency and a loop filter.

In operation, the frequency of the output signal from the VCO is divided by the divider and compared with the fixed frequency/phase of the output of the reference oscillator. If the frequency/phase of the output signal from the divider differs from the frequency/phase of the output of the reference oscillator, the phase detector generates an error signal. The error signal is filtered in the loop filter and fed back to the VCO to drive the VCO in a direction to eliminate the error signal.

The operation of a divider in a phase-locked loop is defined by the general equation:

$$f_{in} = N \cdot f_{out}$$

where $f_{in}$ is the input to the divider and the nominal frequency of the VCO

N is the modulus of the divider by which $f_{in}$ is divided $f_{out}$ is the output of the divider and equals the fixed reference frequency due to feedback action.

To change $f_{in}$ and, hence, the frequency of the VCO, it is necessary to change N and/or the fixed reference frequency.

To change N, it has been the practice to use a programmable divider. The use of a programmable divider, however, is not suitable at high frequencies, e.g. when $f_{in}$ is greater than 80 mHz. This is because at high frequencies, the effective signal path lengths are too long and cause undesirable signal delays in the divider.

Another disadvantage of using a conventional programmable divider is that to obtain a fractional modulus N, complicated and cumbersome logic circuitry is typically required regardless of the frequency of $f_{in}$. This is because a conventional programmable divider, e.g. counter, can only divide by an integer. Heretofore, this has severely restricted the availability of fractional modulus dividers.

In recent years, the frequency limitations of conventional programmable dividers have been overcome by the use of a prescaler between the VCO and the programmable divider.

One type of prescaler is a fixed divider which is specially designed to divide $f_{in}$ down to a frequency which is acceptable as an input to a conventional programmable divider, e.g. less than 80 mHz, without significant signal delays.

Another type of prescaler is a dual modulus prescaler which is specially designed to divide $f_{in}$ by either one of two values, e.g. P or (P+1), with no significant signal delays. In practice, the dual modulus prescalers are typically two fixed prescalers with switching circuitry used to preserve the low delays of the fixed prescalers. Such circuits, for example, are available from Motorola as Part No. 12009 (P=5); Part No. 12011 (P=8); and Part No. 12010 (P=10).

Another important consideration in the design of phase-locked loops concerns loop bandwidth. Loop bandwidth is directly proportional to the frequency of the reference oscillator and as a practical matter, the required bandwidth, i.e. loop response, should be less than 10% of the frequency of the reference oscillator. If it is greater than 10%, the loop becomes unstable, i.e. experiences excessive phase shift and gain loss through the phase detector due to time lag.

SUMMARY OF THE INVENTION

In view of the foregoing, a principal object of the present invention is a novel dividing circuit which operates satisfactorily above 80 mHz, e.g. 500 mHz, which has an output frequency of at least 1 mHz and which can be programmed to have a fractional modulus.

In accordance with the above object, there is provided a dividing circuit comprising a dual modulus prescaler, a programmable divider, and a rate multiplier. The prescaler has a modulus of P and (P+1). The programmable divider can be programmed to have a modulus of A, B, (A−1) or (B+1). The rate multiplier can be programmed to have a modulus Z from 0 to (W−1) where W is the radix of the multiplier.

The performance of the divider of the present invention is given by the general equation:

$$f_{out} = \left[ \frac{W}{Z(N+1) + (W-Z)N} \right] = f_{in}$$

where $f_{out}$ is the frequency of the output of the divider $f_{in}$ is the frequency of the input of the divider

N = A×P+B×(P+1)

N+1 = (A−1)P+(B+1) (P+1)

W = the radix of the rate multiplier, and

Z = any number from 0 to (W−1)

A = H−M−B

B = L+P×H

H = INT [N/P] = N(MOD P)

M = INT [N/P(2P+1)−L/P +0.5], and

L = N−P×H

A principal feature of the present invention is that for any given integer modulus N, the modulus A and the modulus B need only be calculated once. Thereafter, to obtain a fractional modulus, all that is required is to program the rate multiplier with an integer equal to the fractional part of the modulus. For example, if an $f_{out}$ of 1 mHz and a fractional modulus of 501.3 is desired, and a prescaler with P=10 is used, then N, the integer modulus, is 501.

Using the above equations and solving for A and B, it is found that A=27 and B=21. Now, programming the rate multiplier to have a modulus Z of 3 and a radix of 10, it will be found from the above equations that the effective modulus of the divider is 501.3. That is, over 10 cycles of operation, the divider divides with a modulus of 502 three times and a modulus of 501 seven times for an average of 501.3.

BRIEF DESCRIPTION OF THE DRAWINGS

The above and other objects, features and advantages of the present invention will become apparent from the following detailed description of the accompanying drawing, in which.

DESCRIPTION OF THE PREFERRED EMBODIMENTS

Figure 1:
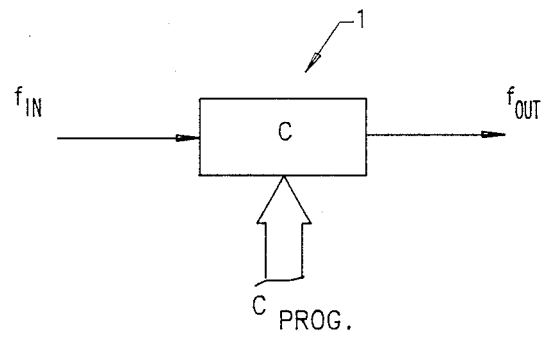
FIG. 1 is a block diagram of a divider.

Referring to FIG. 1, there is provided a conventional programmable divider 1 having a first input for receiving an input signal having a frequency $f_{in}$, a second input for programming divider 1 with a modulus C and an output for providing an output signal having a frequency $f_{out}$.

As used herein, the modulus of a divider is defined as the number by which the input frequency $f_{in}$ is divided to provide $f_{out}$. The operation of the divider 1 is given by the general equation:

$$N = \frac{f_{in}}{f_{out}} = C \tag{1}$$

wherein N is defined as the effective modulus of any divider circuit.

As discussed above, conventional programmable dividers are typically limited to input frequencies of 80 mHz or less because of the signal delays which they produce.

Figure 2:
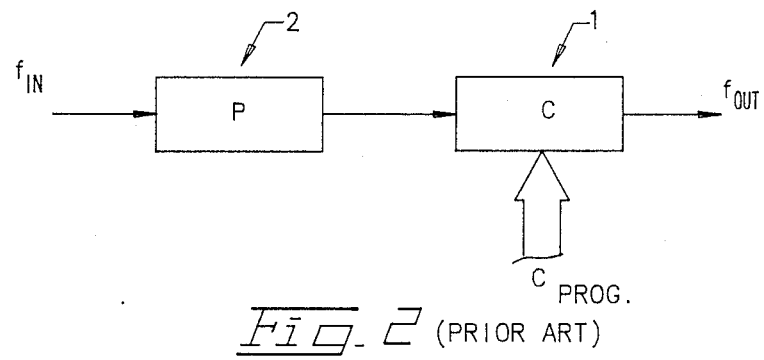
FIG. 2 is a block diagram of the divider of FIG. 1 with a prescaler.

Referring to FIG. 2, if a conventional prescaler 2 having a fixed modulus P were to be added to the above divider 1 for higher frequency operation, the operation would be defined by the following general equation:

$$N = \frac{f_{in}}{f_{out}} = P \cdot C \tag{2}$$

However, the problem with this circuit is that only P values of N can be programmed. This is because the modulus of a conventional programmable divider can be changed only by integer values, e.g. 1, 2, etc. For example, given P=10, C=5 and solving equation (2) for N,:

$$N = 10 \cdot 5 = 50$$

Now, if C is increased or decreased by 1, 2, etc., N will be changed by a factor of ±10, ±20, etc. Fractional values of N are not possible. What is desired is all values of N.

If, however, divider 1 is not merely a conventional programmable divider and can be programmed to have a modulus equal to an integer plus a fraction, i.e. 12.1, 16.4, then all values of N can be programmed. For example:

Let $$C = A + B/P \tag{3}$$

Then $$N = \frac{f_{in}}{f_{out}} = P \cdot C = P(A + B/P) = AP + B \tag{4}$$

By adding ±BP to equation (4), one obtains:

$$N = AP + B + BP - BP = (A-B)P + B(P+1) \tag{5}$$

This equation enables one to construct a fractional divider using a dual modulus prescaler.

Figure 3:
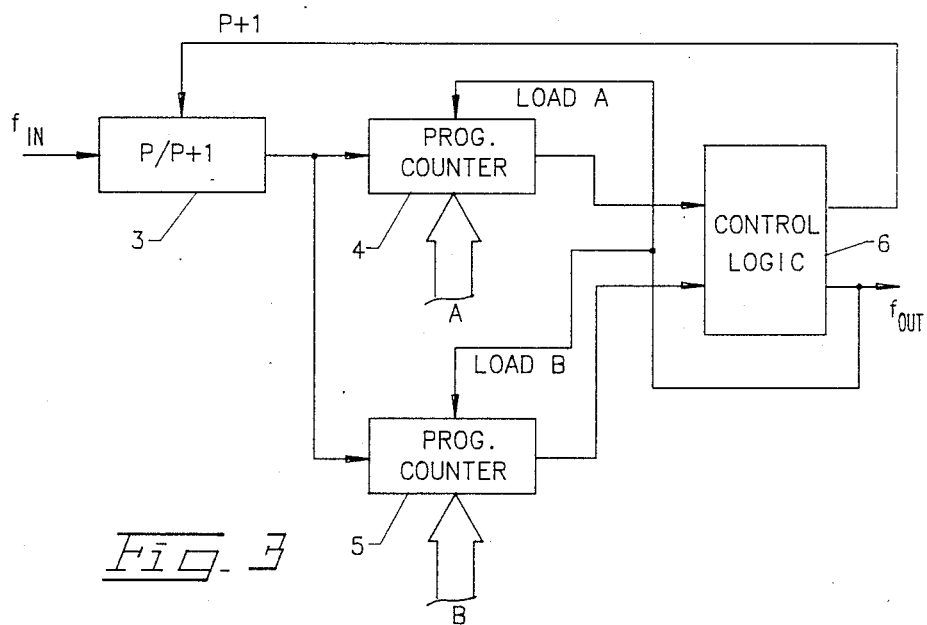
FIG. 3 is a block diagram of a dual modulus divider.

Referring to FIG. 3, there is provided a dual modulus prescaler 3 having a pair of selectable moduluses P and (P+1) coupled to a pair of conventional programmable dividers 4 and 5 which can be programmed to have a modulus A and a modulus B, respectively. The outputs of dividers 4 and 5 are coupled to a control logic circuit 6 for generating control signals (P+1), LOAD A and LOAD B and for switching prescaler 3 between its modulus P and its modulus (P+1) and for loading dividers 4 and 5 to give them their respective moduluses A and B.

In operation the prescaler 3 divides the input frequency $f_{in}$ by (P+1) B times and by P (A−B) times. For every (P+1) pulse into the prescaler, both the A counter and the B counter are decremented by 1. The prescaler divides by P+1 until the B counter reaches the 0 state. At the end of (P+1)·B pulses the state of the A counter equals A−B. The modulus of the prescaler then changes to P. The variable modulus counter divides by P until the remaining count A−B in the A counter is decremented to zero. When this is complete, the A and B counters are reloaded and the cycle repeats.

Figure 4:
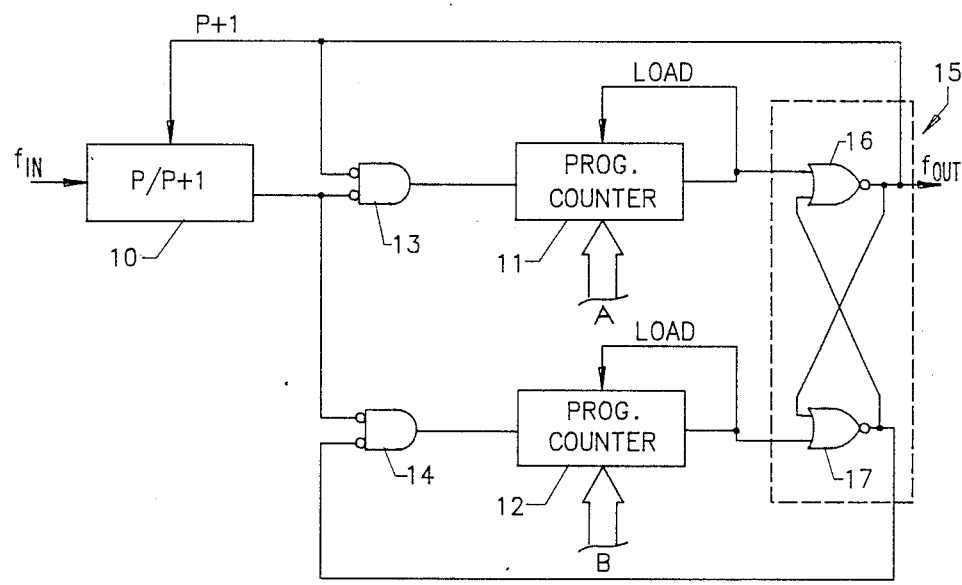
FIG. 4 is a block diagram of an alternative dual modulus divider.

Referring to FIG. 4, there is provided a simpler divider comprising a dual modulus prescaler 10 settable to a modulus P and a modulus (P=1) state coupled to a pair of programmable dividers 11 and 12 by means of a pair of NAND gates 13 and 14, respectively. The set and reset inputs of a flip-flop 15 comprising a pair of cross-coupled NOR gates 16 and 17 are coupled to the dividers 11 and 12 for controlling the modulus of the prescaler 10 and the inputs to the dividers 11 and 12. Dividers 11 and 12 are programmed with a modulus A and a modulus B, respectively In operation, divider 12 with its modulus B decrements to 0 while the prescaler is in its (P=1) state and the divider 11 with its modulus A decrements to 0 while the prescaler is in its P state in accordance with the equation:

$$N = \frac{f_{in}}{f_{out}} = AP + B(P + 1) \tag{6}$$

If the hardware is configured as shown in FIG. 4 such that the B counter decrements to 0 while the prescaler is in the (P+1) state and the A counter decrements to 0 while the prescaler is in the P state, the same counter can be used for A and B as they are being used alternately.

Figure 5:
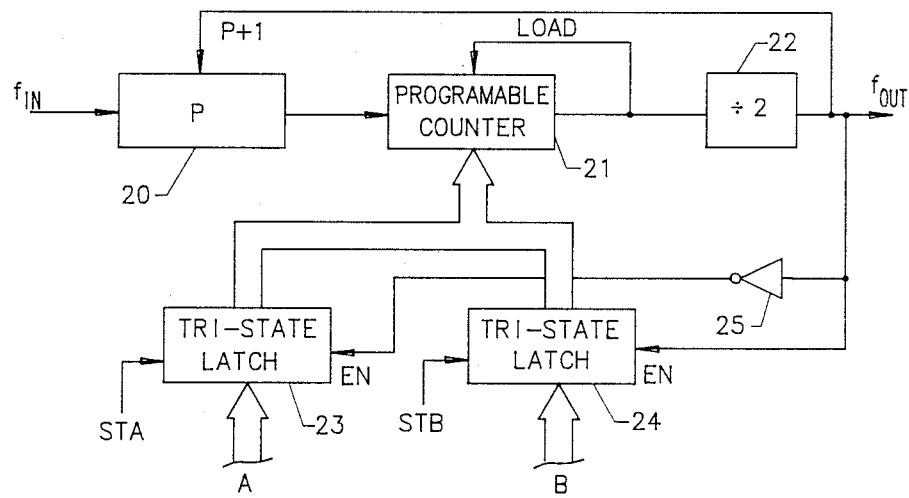
FIG. 5 is a block diagram of a simplified version of FIG. 4.

Referring to FIG. 5, there is provided a simplified version of the circuit of FIG. 4 comprising a dual modulus prescaler 20 coupled to a programmable divider 21. The output of divider 21 is coupled to a divide-by-2 circuit 22. The output of circuit 22 controls the setting of the prescaler 20 to its P and (P+1) states and selectively enables the outputs of a pair of tristate latches 23 and 24.

In operation, a modulus A and a modulus B are latched into latches 23 and 24 by control signals STA and STB, respectively. When the output of circuit 22 is high, prescaler 20 is set to its (P+1) state and the output of latch 24 is enabled, transferring modulus B to divider 21. When divider 21 is decremented to 0, the output of circuit 22 goes low, setting prescaler 20 to its P state and enabling latch 23 through inverter 25 to transfer modulus A to the divider 21. When divider 21 is decremented to 0 again, the output of circuit 22 goes high and the above-described operations are repeated.

Now all that is left to do is to derive an algorithm for the A and B coefficients given P and N. An initial design goal is to have a fairly symmetrical output wave form. This is helpful in two ways:

1. It utilizes the programmable counter 21 to its fullest in both the divide by A and divide by B modes; and
2. It eases the burden on logic following the divide by N.

Thus, repeating equation (6) above:
$N = AP + B(P+1)$ and (7)
$B = A$ for full counter capacity (8)

Substituting equation (8) in equation (7):

$$\begin{aligned} N &= AP + A(P+1) \\ &= AP + AP + A \\ &= A(2P+1) \\ A &= N/(2P+1) \end{aligned}$$ (9)

$A = N/(2P=1)$ (9)

The values of A and B are typically fractional values but conventional programmable dividers will only divide by integer values. If N is converted to the base P using modular arithmetic letting H equal the whole number of P's in N or N(modP) and letting L equal the remainder or "residue", the following formulae are indicated:

$H = \text{INT}(N/P)\ N(\text{mod}P)$ (10)

$L = N - PH$ residue (11)

Let $B = L = N - PH$ (12)

Substituting (12) in (7):

$N = AP + (N - PH)(P+1)$ $AP = N - (N - PH)(P+1)$ $$\begin{aligned} A &= [N - (N - PH)(P+1)]/P \\ &= \frac{N - NP - N + PH + P^2H}{P} \end{aligned}$$

$A = H(P+1) - N$ (13)

since $B = N - PH$ $N = B + PH$ (14)

Substituting (14) in (13)

$$\begin{aligned} A &= H(P+1) - B - PH \\ &= PH + H - B - PH \\ &= H - B \end{aligned}$$ (15)

In summary:
$H = \text{INT}(N/P)$ (10)

$B = N - PH$ (12)

$A = H - B$ (15)

Although these formulae will give values of A and B that satisfy N given P, they do not give a symmetrical output.

Noting that $(P+1)(PM) = P[(P+1)M]$, we can add multiples of $P(P+1)$ to the divide by $(P+1)$ total, $(P+1)B$, and subtract the same multiple from the P total, PA.

Combining (7), (12) and (15) obtains:

$N = P(H-L) + (P+1)L$ (16)

Adding $\pm(P+1)$ PM to equation (16) provides:
$P(H-L) + (P+1)L + (P+1)PM - (P+1)PM = N$
$PH - PL + PL + + P^2M + PM - P^2M - PM = N$
Combining and factoring out P and (P+1) provides:

$P[H - L - (P+1)M] + (P+1)(L + PM) = N$ (17)

where
$H - L - (P+1)M$ is equivalent to the A coefficient in equation (7) and $L + PM$ is equivalent to the B coefficient in equation (7)

or $A = H - L - (P+1)M$ (18)

$B = L + PM$ (19)

Expanding equation (18):

$$\begin{aligned} A &= H - L - PM - M \\ &= H - M - (L + PM) \\ &= H - M - B \end{aligned}$$ (20)

The previous equations will give all values of A and B to satisfy $AP + B(P+1)$. From these equations we will now determine the values of A and B to best utilize the A,B programmable divider.

Recalling:

$B = A$ (8)

$A = N/(2P+1)$ (9)

Substituting equation (8) in equation (9):

$B = N/(2P+1)$ (21)

using this B to solve for M using equation (19):

$B = L + PM$ $$B = L + PM \quad (22)$$
$$M = (B - L)/P$$
$$= \left(\frac{N}{2P+1} - L\right)/P$$

solving to the closest integer $$M = \text{INT}\left[\frac{N}{P(2P+1)} - \frac{L}{P} + .5\right] \quad (23)$$

In summary:

$$H = \text{INT}[N/P] \quad (10)$$
$$L = N - PH \quad (11)$$
$$M = \text{INT}\left[\frac{N}{P(2P+1)} - \frac{L}{P} + .5\right] \quad (23)$$
$$B = L + PM \quad (19)$$
$$A = H - M - B \quad (18)$$

EXAMPLE

Find the value of A and B for N=398 given P=8:
H=INT(N/P)=INT(398/8)=49
L=N−PH=398 −8(49)=398 −392 =6

$$\begin{aligned}
M &= \text{INT}\left(\frac{N}{P(2P+1)} - \frac{L}{P} + .5\right) \\
&= \text{INT}\left(\frac{398}{8(2\cdot 8 + 1)} - \frac{6}{8} + .5\right) \\
&= \text{INT}\left(\frac{398}{136} - .75 + .5\right) = 2
\end{aligned}$$

B=L+PM=6+8(2)=6+16=22
A=H−M−B=49−2−22=25
N check:
N=AP+B(P+1)=25 (8)+22(8+1)=200+198
=398
Duty cycle check:

$$\begin{aligned}
DC &= 50\% - (ABS[(PA - (P+1)B)/N])(50\%) \\
&= 50\% - (ABS[(8(25) - (8+1)(22)]/398])50\% \\
&= 50\% - (ABS[(200 - 198)/398])50\% \\
&= 50\% - (.005)50\% \\
&= 50\% - .25\% \\
&= 49.75\%
\end{aligned}$$

As will now be shown, when fractional division is desired, a factor Z/W must be added to equation (7) such that $$N = AP + B(P+1) + Z/W \quad (24)$$

where
Z, a number corresponding to the fractional resolution, is within the range of 0 to (W−1) and W is the radix of a multiplier.
Also, it is desirable to have an N+1 input line to the divide by N circuit shown in FIG. 5. This line should enable N+1 without the need to change the A and B coefficients originally programmed.

This can be done by inspecting the overall divide formula and adding ±(P+1) to it. Recalling from equation (7) that:

$$N = PA + B(P+1)$$

and
Adding ±(P+1):

$$\begin{aligned}
N &= PA + B(P+1) + (P+1) - (P+1) \quad (25) \\
&= PA + PB + B + P + 1 - P - 1 \\
N+1 &= PA + PB + B + P + 1 - P \\
&= (A-1)P + (B+1)(P+1)
\end{aligned}$$

Equation (25) indicates that when modulus A is presented to the programmable divider 21 of FIG. 5, 1 should be subtracted from it and when modulus B is presented, 1 should be added to it.

Figure 6:
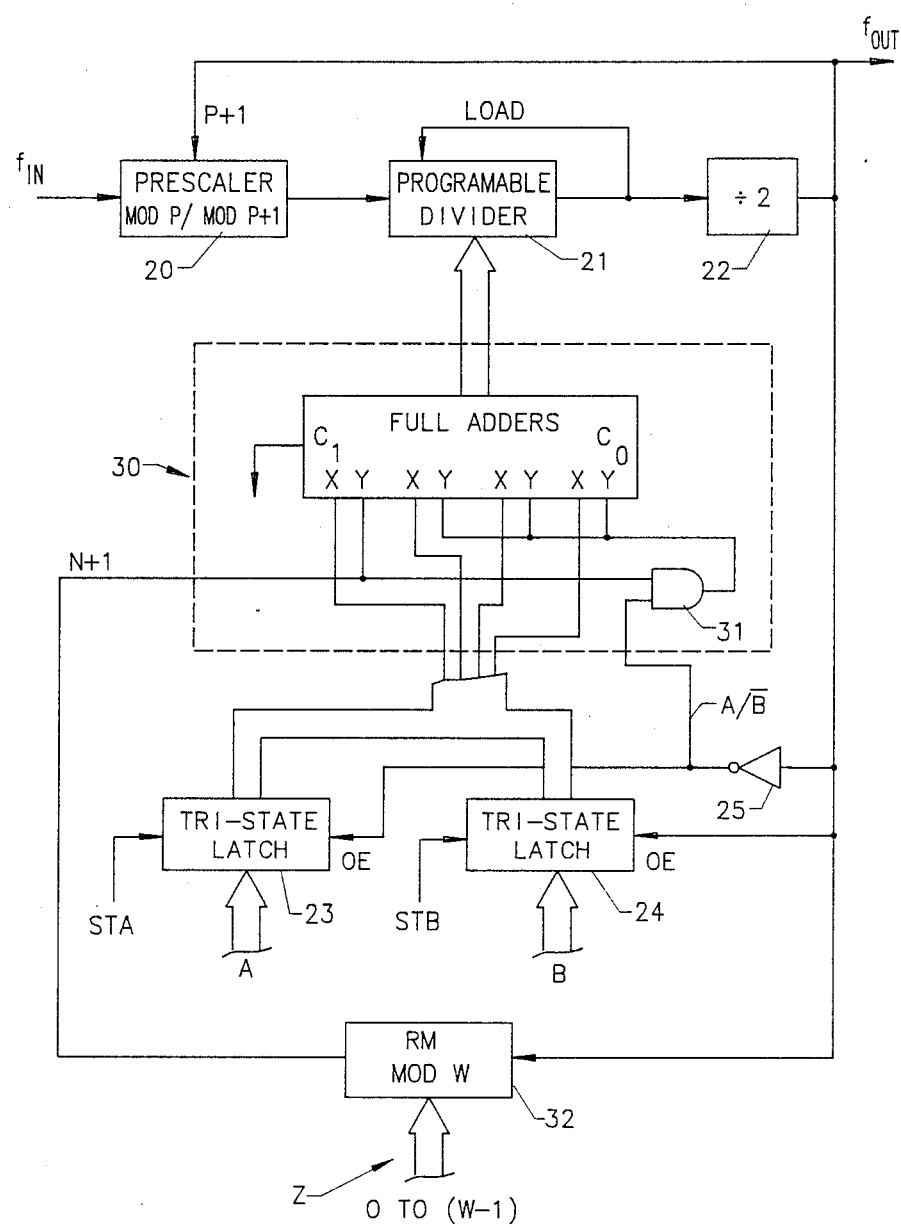
FIG. 6 is a block diagram of a dual modulus fractional divider according to the present invention.

Referring to FIG. 6, there is provided a full adder circuit 30 having a plurality of x and y inputs and an AND gate 31. The x inputs of circuit 30 are coupled to the outputs of the latches 23 and 24. The output of a rate multiplier 32 is coupled to the least significant y input of the circuit 30 and to an input of the gate 31. The output of the gate 31 is coupled to the remaining y inputs of the circuit 30. The output enable control line to latch 23 is coupled to a second input of the gate 31. The rate multiplier 32 is provided with an input from the divide-by-2 circuit 22 and an input for programming the multiplier 32 with a number Z in the range 0 to (W−1) where W is the radix of the multiplier.

In operation, when adding 1 to modulus B, the circuit 30 is simply presented with the modulus B from the latch 24 as one input and 1 as the other input. When substracting 1 from modulus A, the 1's complement of 1 is added to the modulus A from the latch 23.

It can be seen that if N+1 is 0, the output of gate 31 is 0 and 0 is then added to the modulus A and the modulus B from latches 23 and 24. If, however, N+1 is 1 then:
when $A/\overline{B}$ is 0, the modulus B is being transferred from latch 24 to adder circuit 30 and 1 is added to modulus B, and
when $A/\overline{B}$ is 1, the modulus A is being transferred from latch 23 to adder circuit 30 and −1 is added to modulus A.

The generation of N+1=0 and N+1=1 is provided by the rate multiplier 32. For example, if the rate multiplier 32 is a decade rate multiplier, such that W=10, then N+1=1 for Z out of 10 input pulses. If, however, a pair of decade multipliers are cascaded such that (W=100), then N+1=1 for Z out of 100 pulses and so on. For example, given N=501 and P=10, solving equation (18) for A and equation (19) for B, one obtains B=21 and A=27. Now, solving equation (25) for N+1, one obtains N+1=502. Then, if W=10 and Z=3, the effective modulus N of the circuit of FIG. 6 is 501.3, as follows:

$$\begin{aligned}
N = \frac{f_{in}}{f_{out}} &= \frac{Z(N+1) + (W-Z)(N)}{W} \quad (26) \\
&= \frac{3 \cdot 502 + 7 \cdot 501}{10} \\
&= 501.3
\end{aligned}$$

-continued

If $W = 100$, then the $$N = \frac{f_{in}}{f_{out}} = \frac{Z(N+1) + (W-Z)(N)}{W} \quad (26)$$

$$= \frac{3(502) + (100-3)(501)}{100}$$

$$= 501.03$$

Rearranging equation (26) obtains:

$$f_{out} = \left[\frac{W}{Z(N+1) + (W-Z)N}\right] \cdot f_{in} \quad (27)$$

To obtain an effective modulus N for integers other than 501, it is necessary to recalculate A and B using equations (10), (11), (23), (18) and (19). Then, given W, calculate the desired fractional resolution Z. A verification of the correctness of the recalculated A, B and Z for the desired effective modulus N is obtained using equation (24).

From the foregoing, it is seen that the circuit of FIG. 6 will provide an effective modulus to any desired degree of resolution by simply programming the circuit with the desired modulus A, modulus B and resolution Z for a given modulus P and radix W.

While a preferred embodiment of the present invention is described above, it is contemplated that various modifications may be made thereto without departing from the spirit and scope of the present invention. Accordingly, it is intended that the embodiment described be considered only as an illustration of the present invention and that the scope thereof should not be limited thereto but be determined by reference to the claims hereinafter provided.

What is claimed is:

1. A dual modulus fractional divider having an effective modulus N, an input and an output, comprising:
   a prescaler coupled to said input, having a modulus P and a modulus (P+1);
   a programmable divider coupled to said prescaler;
   means for selectively programming said programmable divider with a modulus A, a modulus B, a modulus (A−1) and a modulus (B+1); and
   control means, including a rate multiplier, coupled to said prescaler, said programmable divider and said programming means for providing on said output of said fractional divider an output signal having a plurality of cycles with a frequency $f_{out}$ from an input signal applied to said input of said fractional divider having a plurality of cycles with a frequency $f_{in}$ wherein:

$$f_{out} = \left(\frac{W}{Z(N+1) + (W-Z)N}\right) \cdot f_{in}$$

N=A×P+B×(P+1)
N+1=(A−1)P+(B+1) (P+1)
W=the radix of said rate multiplier, and
Z=any number from 0 to (W−1)
A=H−M−B
B=L+P×H
H=INT (N/P)=N(MOD P)
M=INT {[N/P(2P+1)]−[L/P]+0.5 }, and
L=N−P×H.

2. A dual modulus fractional divider having an input and an output comprising:
   a prescaler coupled to said input, having a modulus P and a modulus (P+1);
   a programmable divider coupled to said prescaler;
   means for selectively programming said programmable divider with a modulus A, a modulus B, a modulus (A−1) and a modulus (B+1); and
   control means, including a rate multiplier having an input for programming said multiplier with a fractional resolution integer Z, coupled to said prescaler, said programmable divider and said programming means for selectively providing and output signal on said output of said fractional divider having a plurality of cycles with a frequency $f_{out}$ equal to an input signal applied to said input of said fractional divider having a plurality of cycles with a frequency $f_{in}$ divided by (P) A times and by (P+1) B times when Z=0 and an output signal on said output of said fractional divider having a plurality of cycles with a frequency $f_{out}$ equal to an input signal applied to said input of said fractional divider having a plurality of cycles with a frequency $f_{in}$ divided by (N+1) C times and by N (W−C) times when Z=C and 0<C<W wherein:
N=A×P+B×(P+1)
N+1=(A−1)P+(B+1) (P+1)
W=the radix of said rate multiplier, and
Z=any number from 0 to (W−1)
A=H−M−B
B=L+P×H
H=INT (N/P)=N(MOD P)
M=INT{[N/P(2P+1)]−[L/P]+0.5}, and
L=N−P×H.

3. A dual modulus fractional divider having an input and an output, comprising:
   a prescaler coupled to said input, having a modulus P and a modulus (P+1);
   a programmable divider coupled to said prescaler having a plurality of moduluses including a modulus A, a modulus B, a modulus (A−1) and a modulus (B+1);
   first means responsive to an output from said programmable divider for changing said modulus of said prescaler between said modulus P and said modulus (P+1); and
   second means responsive to an output from said first means for selectively changing said modulus of said programmable divider between said modulus A, said modulus B, said modulus (A−1) and said modulus (B+1).

4. A dual modulus fractional divider according to claim 3 wherein said first means comprises a divide-by-2 circuit coupled between said programmable divider and said prescaler, and said second means comprises:
   latching means;
   means for storing said modulus A and said modulus B in said latching means;
   means for adding and subtracting;
   means responsible to said divide-by-2 circuit for selectively transferring said modulus A and said modulus B from said latching means to said adding and subtracting means;
   a rate multiplier responsive to said divide-by-2 circuit for providing a first and a second output signal;
   means in said adding and subtracting means which is responsive to said first output signal from said rate multiplier for providing a first output signal from said adding and subtracting means which is equal to modulus A and to said second output signal from said rate multiplier for providing a second output signal from said adding and subtracting means which is equal to modulus (A−1) when said modulus A is being transferred to said adding and subtracting means, and responsive to said first output signal from said rate multiplier for providing a third output signal from said adding and subtracting means which is equal to modulus B and to said second output signal from said rate multiplier for providing a fourth output signal from said adding and subtracting means which is equal to modulus (B+1) when said modulus B is being transferred to said adding and subtracting means; and means for transferring said first, said second, said third and said fourth output signals from said adding and subtracting means to said programmable divider.

5. A dual modulus fractional divider according to claim 4 wherein said adding and subtracting means comprises a full adder, said modulus (A−1) is provided by adding the 1's complement to modulus A and said modulus (B+1) is provided by adding 1 to modulus B.

6. A dual modulus fractional divider according to claim 4 wherein said rate multiplier comprises a radix W and means for programming said rate multiplier with a value Z wherein Z is any number from 0 to (W−1).

* * * * *

UNITED STATES PATENT AND TRADEMARK OFFICE
CERTIFICATE OF CORRECTION

PATENT NO. : 4,891,774
DATED : January 2, 1990
INVENTOR(S) : DONALD A. BRADLEY

It is certified that error appears in the above-identified patent and that said Letters Patent is hereby corrected as shown below:

```
Column 4, line 44, "(P=1)" should be "(P+1)".
          line 54, "(P=1)" should be "(P+1)".
Column 5, line 38, delete "A=N/(2P=1)".
Column 6, line 29 should read: PH-PL+PL+L+P²M+PM-P²M-PM=N.
          line 66, delete "B = L+PM"
Column 7, line 50 should read:
             = 50% - (ABS[(8(25)-(8+1)(22)/398)])50%.
Column 10, line 13, "and" should be "an".
           line 60, "responsible" should be "responsive".
```

Signed and Sealed this

First Day of January, 1991

Attest:

HARRY F. MANBECK, JR.

*Attesting Officer*      *Commissioner of Patents and Trademarks*